US012000568B2

(12) United States Patent
Brunne et al.

(10) Patent No.: US 12,000,568 B2
(45) Date of Patent: Jun. 4, 2024

(54) HEAD LAMP MODULE FOR A MOTOR VEHICLE

(71) Applicant: Hella GmbH & Co. KGaA, Lippstadt (DE)

(72) Inventors: David Brunne, Lippstadt (DE); Björn Dreßler, Menden (DE); Ronny Letzin, Lippstadt (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 17/935,350

(22) Filed: Sep. 26, 2022

(65) Prior Publication Data

US 2023/0014251 A1 Jan. 19, 2023

Related U.S. Application Data

(63) Continuation of application No. PCT/EP2020/059757, filed on Apr. 6, 2020.

(51) Int. Cl.

| | |
|---|---|
| ***F21V 19/00*** | (2006.01) |
| ***F21S 41/141*** | (2018.01) |
| ***F21S 41/19*** | (2018.01) |
| ***F21S 41/20*** | (2018.01) |
| *F21Y 115/10* | (2016.01) |

(52) U.S. Cl.

CPC .......... *F21V 19/003* (2013.01); *F21S 41/141* (2018.01); *F21S 41/192* (2018.01); *F21S 41/20* (2018.01); *F21Y 2115/10* (2016.08)

(58) Field of Classification Search

CPC ..... F21V 19/003; F21S 41/141; F21S 41/192; F21S 41/20; F21Y 2115/10

See application file for complete search history.

(56) References Cited

U.S. PATENT DOCUMENTS

| | | | | |
|---|---|---|---|---|
| 2016/0033101 | A1* | 2/2016 | Yan | F21S 41/143 362/520 |
| 2018/0031199 | A1* | 2/2018 | Meyrenaud | F21S 41/60 |
| 2018/0073700 | A1* | 3/2018 | Orisich | F21S 41/635 |
| 2019/0017675 | A1* | 1/2019 | Suwa | F21S 41/24 |
| 2019/0086050 | A1* | 3/2019 | Dikau | F21S 41/322 |
| 2020/0032973 | A1* | 1/2020 | Renaud | F21S 41/285 |
| 2020/0063939 | A1* | 2/2020 | Qiu | F21S 41/322 |

FOREIGN PATENT DOCUMENTS

| | | | |
|---|---|---|---|
| CN | 105258057 | B | 11/2017 |
| CN | 107664290 | A | 2/2018 |
| DE | 102017214407 | A1 | 2/2019 |
| EP | 2306075 | A2 | 4/2011 |
| WO | 2017198516 | A1 | 11/2017 |
| WO | 2019211120 | A1 | 11/2019 |
| WO | 2020193066 | A1 | 10/2020 |

* cited by examiner

*Primary Examiner* — Evan P Dzierzynski
(74) *Attorney, Agent, or Firm* — Husch Blackwell LLP

(57) ABSTRACT

A head lamp module for a motor vehicle is provided, and includes one single printed circuit board, a first group of light sources, a second group of light sources, a lens and an optical device. The first group of light sources and the second group of light sources are both arranged on the printed circuit board. The first group of light sources and the second group of light sources emit light to the optical device. The optical device is adapted to guide the emitted light in a direction towards the lens. The light leaves the head lamp module through the lens.

12 Claims, 4 Drawing Sheets

HEAD LAMP MODULE FOR A MOTOR VEHICLE

CROSS REFERENCE

This application claims priority to PCT Application No. PCT/EP2020/059757, filed Apr. 6, 2020, the entirety of which is hereby incorporated by reference.

FIELD OF THE INVENTION

The invention relates to a head lamp module for a motor vehicle.

BACKGROUND OF THE INVENTION

It is known to construct head lamps for motor vehicles by combining different modules. Such a modular system comprises several modules, which can be combined. These modular systems have decreased the necessary amount of work for constructing a head lamp for a motor vehicle.

Further, head lamp modules are known as a part of a modular system. Often, head lamp modules comprise several lighting sources, which are arranged in a matrix. These lighting sources are often light emitting diodes (LEDs). WO 2019/193066 A1 discloses a head lamp module with different group of light sources. A first group is arranged on a first printed circuit board. This group is adapted to emit a low beam. A second group is arranged on a second printed circuit board. This group is adapted to emit a high beam.

BRIEF SUMMARY OF THE INVENTION

It is an object of the present invention to provide a head lamp module with reduced manufacturing costs. Further, a head lamp with such a head lamp module, a motor vehicle with such a head lamp and a modular system for constructing such a head lamp shall be provided.

The head lamp module may comprise one single printed circuit board, a first group of light sources, a second group of light sources, a lens and an optical device. The term "one single" means in particular in this description that only this one single component is present. Thus, there are no more printed circuit boards pre-sent in the head lamp module except for the one single printed circuit board. The optical device may for example be a primary optic device. In particular, it is possible that the optical device is the only primary optic device of the head lamp module.

The first group of light sources and the second group of light sources are both arranged on the printed circuit board. Both group of light sources are arranged on the printed circuit board. Both group of light sources emit light to the optical device. Thus, the optical device is adapted to receive light from both group of light sources. The optical device is further adapted to guide the emitted light in a direction towards the lens. The light leaves the head lamp module through the lens.

This head lamp module is in particular advantageous because both groups of light sources are arranged on the one single printed circuit board. Further, only one optical device receives the light directly from both groups of light sources. Both features are in particular advantageous because the head lamp module can for example be a bimatrix head lamp module. In this case, for example the first group of light sources may be adapted to emit light, which leaves the head lamp module as low beam light. The second group of light sources may be adapted to emit light, which leaves the head lamp module as high beam light. The high beam light may in particular be an adaptive high beam light.

Using only one printed circuit board and the optical device for both groups of light sources reduces the manufacturing costs. Thus, such a head lamp module could also be used for cost sensitive motor vehicles.

According to an embodiment of the invention the lens may be adapted to assume a first state or a second state. The lens may be transferrable from the first to the second state and vice versa. The lens may be adapted to have a different effect on a light distribution emitted by the headlamp module in the first state than in the second state.

According to an embodiment of the invention the optical device comprises a first group of light coupling surfaces and a second group of light coupling surfaces. The first group of light coupling surfaces is adapted to receive light from the first group of light sources. The second group of light coupling surfaces is adapted to receive light from the second group of light sources.

According to an embodiment of the invention each light coupling surface is adapted to receive light from exactly one single light source of the light sources. This can particularly apply to both groups of light coupling surfaces.

According to an embodiment of the invention the optical device is dismountable from the head lamp module as a whole. In particular, this can mean that the optical device may be fastened to another component of the head lamp module with fastening elements. When these fastening elements are loosened the optical device can be dismounted as a whole. Thus, there is no need to disassemble the optical device in order to remove it from the head lamp module.

According to an embodiment of the invention the optical device comprises geometrical light ways and air channels between the light ways. The term "geometrical" means particularly that the light ways are present virtually and not as real components. A geometrical light way is a geometrical construction that defines the way the light takes.

Each light way may correspond to one of the light sources of the second group of light sources. The light of each of the light sources of the second group of light sources may be emitted via the corresponding light way. The emitted light may be totally reflected at the interfaces between the light ways and the air channels. For example, the geometrical light ways may lead through glass and/or plastic material. In this case, total reflection may occur at the interfaces between the glass and the air channels and/or between the plastic material and the air channels.

This embodiment is especially advantageous for an adaptive high beam light. Each light source may for example illuminate a certain area in front of the motor vehicle because of these light ways being separated by the air channels. This allows to avoid blinding other road users by switching off certain light sources.

According to an embodiment of the invention the light emitted by the first group of light sources leaves the head lamp module as low beam light.

According to an embodiment of the invention the light emitted by the second group of light sources leaves the head lamp module as high beam light.

According to an embodiment of the invention the optical device comprises a shutter element. The shutter element may be adapted to limit the range of the light emitted by the first group of light sources.

According to an embodiment of the invention the light sources are light emitting diodes.

According to an embodiment of the invention the light sources of the second group of light sources are adapted to be switched on and off independently. In particular, it is possible that each light source of the second group of light sources can be switched on and off independently from the other light sources of the second group of light sources.

The head lamp may comprise several module slots and several lighting modules. The lighting modules are mounted in the module slots. One of the lighting modules is a head lamp module according to an embodiment of the invention. It is possible that the lighting modules may be replaced by each other.

According to an embodiment of the invention the head lamp module is dismountable as a whole independently from the other lighting modules.

The motor vehicle may comprise a head lamp according to an embodiment of the invention.

The modular system for constructing a head lamp may comprise a head lamp according to an embodiment of the invention. The modular system further comprises several body units and several lighting modules. Each body unit comprises several module slots. The lighting modules comprise a head lamp module according to an embodiment of the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
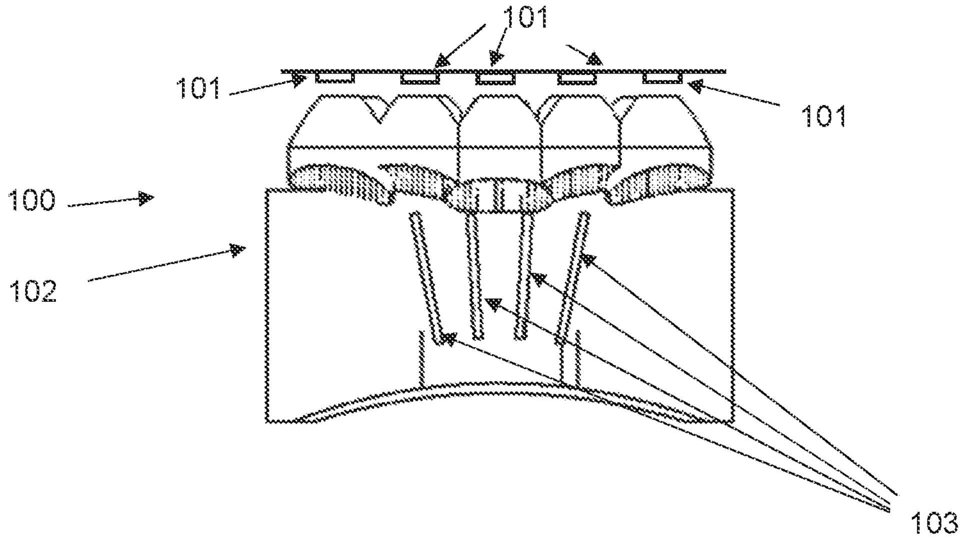
FIG. 1 shows a schematic top view of a head lamp module according to an embodiment of the invention.
Figure 2:
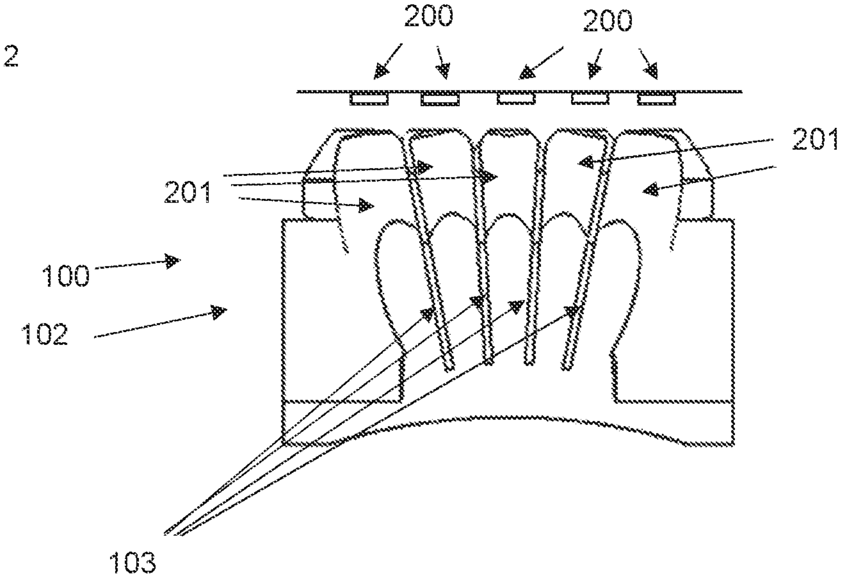
FIG. 2 shows a schematic bottom view of the head lamp module of FIG. 1.

The head lamp module 100 comprises a first group of light sources 101, a second group of light sources 200, an optical device 102, several air channels 103, geometrical light ways 201, a lens 300 and a printed circuit board 301. The first group of light sources 101 is adapted to emit low beam light. The second group of light sources 200 is adapted to emit high beam light. The light emitted by both groups of light sources 101 and 200 is transmitted through the optical device 102. The optical device 102 comprises the geometrical light ways 201 and the air channels 103, wherein the air channels separate the geometrical light ways 201 from each other. Thus, each air channel 103 is located between two geometrical light ways 201. The geometrical light ways 201 may lead through glass and/or plastic material. Thus, this glass and/or plastic material may be separated by the air channels 103.

Figure 3:
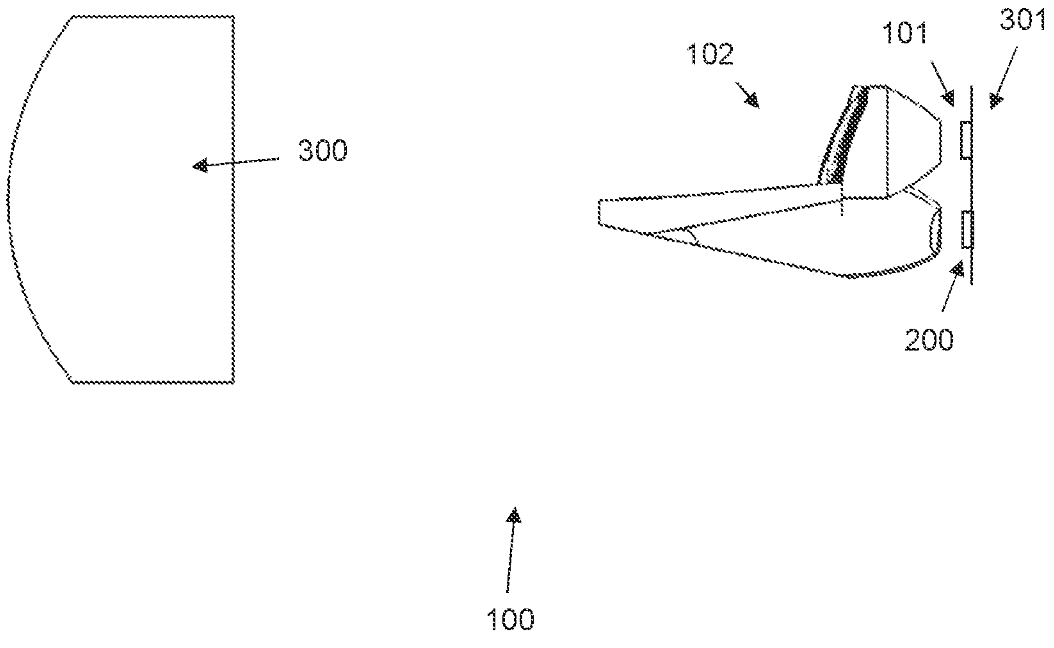
FIG. 3 shows a schematic side view of the head lamp module of FIG. 1.

In FIG. 3 is shown that the first group of light sources 101 and the second group of light sources 200 are arranged on the same and single circuit board 301. This reduces manufacturing costs. Further, the optical device 102 is mountable to and dismountable from the head lamp module 100 as a whole. This reduces the manufacturing costs even more.

In operation, the first group of light sources 101 and the second group of light sources 200 emit light towards the optical device 102. Each light source 200 of the second group of light sources 200 corresponds to one single geometrical light way 201. Thus the light of the respective light source 200 of the second group of light sources is only emitted to one single corresponding geometrical light way 201. The light of the second group of light sources 200 is reflected totally at the interfaces between the geometrical light ways 201 and the air channels 103. Thus, the light may not pass from one geometrical light way 201 to another geometrical light way 201. The light passes through the optical device 102 towards the lens 300. The light leaves the head lamp module 100 through the lens 300.

Figure 4:
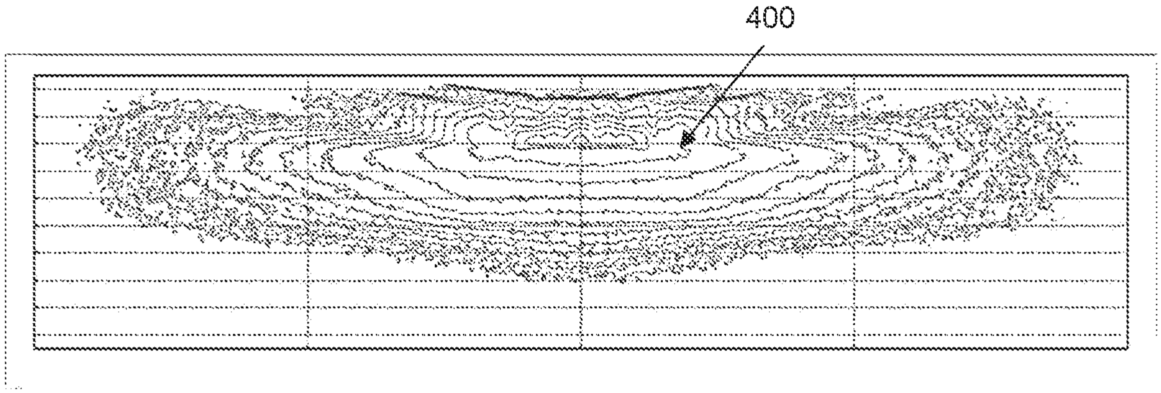
FIG. 4 shows a schematic light distribution generated by the head lamp module of FIG. 1.
Figure 5:
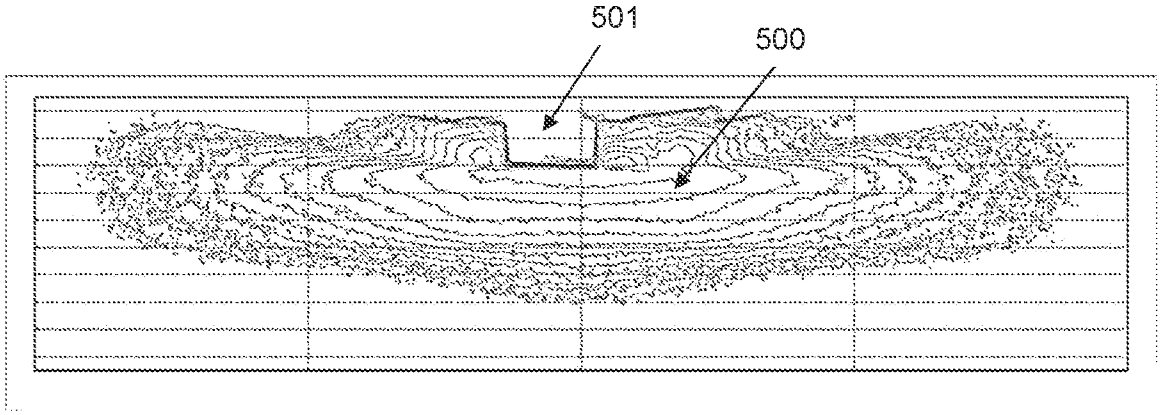
FIG. 5 shows a schematic light distribution with an anti-glare tunnel generated by the head lamp module of FIG. 1.

The light distribution 400 shown in FIG. 4 is generated by the second group of light sources 200 with all light sources 200 switched on. The light distribution 500 shown in FIG. 5 is generated by the second group of light sources 200 with all light sources 200 except for one switched on. Thus, one of the light sources 200 is switched off.

Due to the light ways 201 being separated by the air channels 103 the tunnel 501 shown in FIG. 5 is created. This tunnel 501 was illuminated in light distribution 400 of FIG. 4 only by the light source 200 that is switched off for creating the light distribution 500 of FIG. 5.

Figure 6:
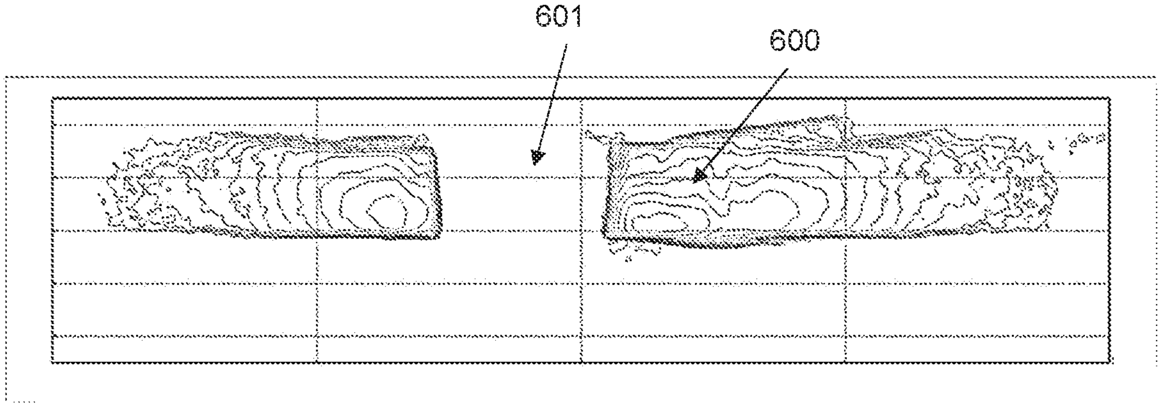
FIG. 6 shows a schematic light distribution with a dark middle area generated by the head lamp module of FIG. 1.
Figure 7:
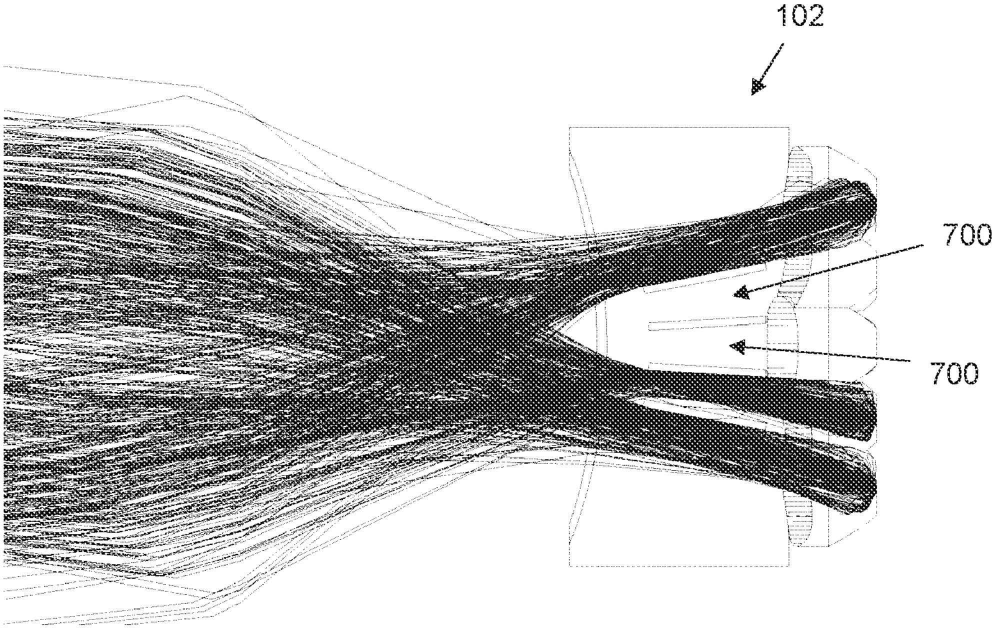
FIG. 7 shows a schematic top view of the head lamp module of FIG. 1 generating the light distribution of FIG. 6.

This principle is further explained with respect to FIGS. 6 and 7. In FIG. 6 a light distribution 600 is shown with a dark middle area 601. This light distribution 600 is created by a switching the second group of light sources 200 shown in FIG. 7. In FIG. 7 two geometrical light ways 700 do not transmit any light. Thus, the corresponding light sources 200 are switched off while all other light sources 200 of the second group of light sources 200 are switched on. This results in the light distribution 600 shown in FIG. 6.

The tunnel 501 and the dark middle area 601 may be used to avoid glaring of other road users.

LIST OF REFERENCE SIGNS

100 Head lamp module
101 Light source
102 Optical device
103 Air channel
200 Light source
201 Geometrical light way
300 Lens
301 Printed circuit board
400 Light distribution
500 Light distribution
501 Tunnel
600 Light distribution
601 Dark middle area
700 Geometrical light way

The invention claimed is:

1. A head lamp module for a motor vehicle, the head lamp module comprising:

one single printed circuit board;

a first group of light sources;

a second group of light sources, wherein the first group of light sources and the second group of light sources are both arranged on the printed circuit board;

a lens;

an optical device formed from a single component, the optical device including a first group of light coupling surfaces, a second group of light coupling surfaces, and a plurality of air channels, wherein the plurality of air channels are each elongated pockets positioned and located between a plurality of geometrical light ways, and wherein the plurality of air channels converge toward the lens;

wherein the first group of light coupling surfaces are positioned and located to receive light emitted from the first group of light sources;

wherein the second group of light coupling surfaces are positioned and located to receive light emitted from the second group of light sources;

wherein the plurality of geometrical light ways are each positioned and located to receive light from one of the light coupling surfaces from the second group of light coupling surfaces;

wherein the optical device is adapted to guide the light emitted from the first group of light sources and the second group of light sources in a direction towards the lens; and wherein the light leaves the head lamp module through the lens.

2. The head lamp module according to claim 1, wherein the lens is adapted to assume a first state or a second state, wherein the lens is transferrable from the first to the second state and vice versa, and wherein the lens has a different effect on a light distribution emitted by the headlamp module in the first state than in the second state.

3. The head lamp module according to claim 1, wherein each light coupling surface of the first group of light coupling surfaces receives light from exactly one single light source of the first group of light sources, and wherein each light coupling surface of the second group of light coupling surfaces receives light from exactly one single light source of the second group of light sources.

4. The head lamp module according to claim 1, wherein the optical device is dismountable from the head lamp module as a whole.

5. The head lamp module according to claim 1, wherein the light emitted from the second group of light sources is totally reflected at the interfaces between the geometrical light ways and the air channels.

6. The head lamp module according to claim 1, wherein the light emitted by the first group of light sources leaves the head lamp module as low beam light.

7. The head lamp module according to claim 1, wherein the light emitted by the second group of light sources leaves the head lamp module as high beam light.

8. The head lamp module according to claim 1, wherein the optical device comprises a shutter element, the shutter element limiting a range of light emitted by the first group of light sources.

9. The head lamp module according to claim 1, wherein the light sources are light emitting diodes.

10. The head lamp module according to claim 1, wherein the light sources of the second group of light sources are adapted to be switched on and off independently.

11. A head lamp module for a motor vehicle, the head lamp module comprising:

one single printed circuit board;

a first group of light sources;

a second group of light sources, wherein the first group of light sources and the second group of light sources are both arranged on the printed circuit board;

a lens;

an optical device formed from a single component, the optical device including a first group of light coupling surfaces, a second group of light coupling surfaces, and a plurality of air channels, wherein the plurality of air channels are elongated pockets positioned and located between a plurality of geometrical light ways, and wherein the plurality of air channels each include a substantially uniform thickness extending along a portion of each air channel;

wherein the first group of light coupling surfaces are positioned and located to receive light emitted from the first group of light sources;

wherein the second group of light coupling surfaces are positioned and located to receive light emitted from the second group of light sources;

wherein the plurality of geometrical light ways are each positioned and located to receive light from one of the light coupling surfaces from the second group of light coupling surfaces;

wherein the optical device is adapted to guide the light emitted from the first group of light sources and the second group of light sources in a direction towards the lens; and wherein the light leaves the head lamp module through the lens.

12. A head lamp module for a motor vehicle, the head lamp module comprising:

one single printed circuit board;

a first group of light sources;

a second group of light sources, wherein the first group of light sources and the second group of light sources are both arranged on the printed circuit board;

a lens;

an optical device formed from a single component, the optical device including a first group of light coupling surfaces, a second group of light coupling surfaces, and a plurality of air channels;

wherein the plurality of air channels are elongated pockets positioned and located between a plurality of geometrical light ways, wherein the plurality of air channels each include a first linear surface and a second linear surface, and wherein the first linear surface and the second linear surface each extend a length that is substantially similar for each air channel from the plurality of air channels;

wherein the first group of light coupling surfaces are positioned and located to receive light emitted from the first group of light sources;

wherein the second group of light coupling surfaces are positioned and located to receive light emitted from the second group of light sources;

wherein the plurality of geometrical light ways are each positioned and located to receive light from one of the light coupling surfaces from the second group of light coupling surfaces;

wherein the optical device is adapted to guide the light emitted from the first group of light sources and the second group of light sources in a direction towards the lens; and wherein the light leaves the head lamp module through the lens.

* * * * *